United States Patent [19]

Phillips et al.

[11] 4,010,131

[45] Mar. 1, 1977

[54] QUATERNARY MODIFIED ACRYLAMIDE POLYMERS

[75] Inventors: Kenneth G. Phillips, River Forest; Edward G. Ballweber, Glenwood; Karen A. Nordquist, Clarendon Hills; Robert A. Miller, Chicago, all of Ill.

[73] Assignee: Nalco Chemical Company, Oak Brook, Ill.

[22] Filed: Apr. 18, 1975

[21] Appl. No.: 560,435

Related U.S. Application Data

[63] Continuation-in-part of Ser. No. 486,715, July 8, 1974, abandoned.

[52] U.S. Cl. .......................... 260/29.4 UA
[51] Int. Cl.$^2$ .......................... C08G 51/24
[58] Field of Search .......... 260/29.4 UA, 72, 851

[56] References Cited

UNITED STATES PATENTS

| | | | |
|---|---|---|---|
| 2,328,901 | 9/1943 | Grimm et al. | 260/72 |
| 2,935,493 | 5/1960 | Schuller et al. | 260/72 |
| 3,284,393 | 11/1966 | Vanderhoff et al. | 260/29.6 |
| 3,539,535 | 11/1970 | Wisner | 260/72 |
| 3,556,932 | 1/1971 | Coscia et al. | 260/29.4 |
| 3,624,019 | 11/1971 | Anderson | 260/29.6 |
| 3,734,873 | 5/1973 | Anderson | 260/29.6 |
| 3,766,156 | 10/1973 | Kine et al. | 260/86.1 N |

Primary Examiner—Theodore E. Pertilla
Attorney, Agent, or Firm—John G. Premo; Robert A. Miller; Barry W. Sufrin

[57] ABSTRACT

A method for the preparation of quaternary modified acrylamide polymers is disclosed. Applicable to both solutions of acrylamide polymer and to water-in-oil emulsions of finely divided acrylamide polymer, the method involves reacting the acrylamide with a secondary amine formaldehyde adduct followed by quaternization with an alkylating agent and then, stabilization. The composition of these polymers is also disclosed.

10 Claims, No Drawings

QUATERNARY MODIFIED ACRYLAMIDE POLYMERS

This is a continuation-in-part of our earlier filed copending application Ser. No. 486,715, filed July 8, 1974 and now abandoned.

INTRODUCTION

This invention relates to a new and improved method for preparing water soluble cationic polymers by reacting a cationic formaldehyde adduct with an acrylamide polymer, followed by reacting the cationically modified acrylamide polymer formed with an alkylating agent to produce a quaternary modified acrylamide polymer. The cationic formaldehyde adduct is prepared by reacting formaldehyde with a secondary amine. This formaldehyde adduct is then added to the acrylamide polymer which is subsequently treated with an alkylating agent at alkaline pH to produce the quaternary salt of the previous Mannich derivative.

U.S. Pat. No. 2,328,901 teaches the reaction of an amine with formaldehyde and then reacting with the water soluble polymeric acrylamide. This particular reference teaches the formation of an aldehyde adduct which is in turn reacted with polyacrylamide. There have been serious problems with this method of the prior art. The polymers produced by this method must be made in dilute form, and cannot be stored over a great length of time due to decomposition of the product due to crosslinking or the reversal of the Mannich reaction.

The method of this invention involves a new improved method for preparing water soluble cationic polymers. A method of this invention involves preparing a cationic formaldehyde adduct and then reacting the adduct with either a water soluble solution of an acrylamide polymer or with a water-in-oil emulsion of a finely divided acrylamide polymer, followed by subsequent treatment of the cationic products so formed with an alkylating agent to produce a quaternary modified acrylamide polymer. The method of this invention provides to the art a new and improved method for preparing cationic polymers which are stable over long periods of time as well as providing a source of inexpensive high molecular weight water soluble cationically modified acrylamide polymer.

OBJECTS

It is therefore an object of this invention to provide a method for preparing water soluble quaternary modified acrylamide polymers.

Another object of this invention is to provide a method for preparing a stable water-in-oil emulsion of finely divided quaternary modified acrylamide polymers.

A further object of this invention is to provide a method for preparing guartenary modified acrylamide polymers by preparing a formaldehyde dimethylamine adduct and reacting the adduct with either a water-in-oil emulsion of a finely divided acrylamide polymer, or with a concentrated aqueous solution of acrylamide polymer followed by subsequent treatment with an alkylating agent to produce a stable cationic quaternary modified acrylamide polymer.

Other objects will appear hereinafter.

This invention involves a method for preparing water soluble quaternary modified polymers by preparing a cationic formaldehyde adduct and reacting the adduct with either a water-in-oil emulsion of a finely divided acrylamide polymer or with a concentrated aqueous solution of acrylamide polymer and subsequent treatment with an alkylating agent to produce the quaternary modified acrylamide polymer.

THE FORMALDEHYDE ADDUCT

This invention involves the formation of a formaldehyde-secondary amine adduct. This adduct can be conveniently prepared by mixing together an aqueous formaldehyde solution, with a secondary amine. This reaction may take place at ambient temperature or may be performed at elevated temperatures. However the reaction proceeds at a rapid rate at ambient temperature. The preferred secondary amine is dimethylamine. The ratio of formaldehyde to dimethylamine may vary over a wide range, the preferred mole ratio is within the range of 2:1 to 1:2. Typically, it is advisable to have a molar excess of the amine present when making the adduct so as to inhibit crosslinking in later steps. The adduct should be made in as high a concentration as possible, so as to avoid dilution of the end product during subsequent steps. Typically, the adducts are from 0.1 to 55% by weight in solution. When using a solution of 38% formaldehyde in water and a 60% aqueous solution of dimethylamine in a one to one mole ratio, a 48.7% solution by weight is obtained, of the N,N-dimethylaminomethanol adduct is obtained.

While the preferred secondary amine is dimethylamine, other secondary amines, preferably those containing a 3–8 carbon atoms and which include methylethylamine, morpholine, diethylamine, piperidine, diisopropylamine and dibutylamine can be used. The amines used can be aliphatic or cyclic, straight chained, or branched.

THE AQUEOUS SOLUTIONS OF ACRYLAMIDE POLYMER

The aqueous solutions of acrylamide polymers as used in this invention should contain from 10 to 50% by weight of an acrylamide polymer. The molecular weights of these polymers are reasonably low, having intrinsic viscosities of from 0.1 to 0.7. The acrylamide polymers as used in the subject of this invention may be homopolymers of acrylamide or copolymers of acrylamide, with at least 20 and preferably 75% by weight of acrylamide or another water soluble monomer with amide functionality.

The aqueous solution of an acrylamide polymer, are typically made by polymerizing an acrylamide polymer in water through the use of suitable chain transfer agents and using a redox catalyst system. Typically, these solutions of polyacrylamide contain from 1–48% by weight acrylamide. Preferably, they should contain from 20–30% acrylamide by weight. A suitable chain transfer agent employed in the solution polymerization of acrylamide is isopropanol, at a 50–200% by weight level based on monomer. Care should be taken to distill off excess isopropanol prior to treating the polymer with the formaldehyde-secondary amine adduct.

THE WATER-IN-OIL EMULSION OF FINELY DIVIDED ACRYLAMIDE POLYMER

In general, the polymer emulsions are stable yet at the same time contain relatively large amounts of polymer. The polymers dispersed in the emulsion are quite stable when the particle size of the polymer is within the range of 2 millimicrons up to about 5 microns. The preferred particle size is within the range of 5 millimicrons and 3 microns.

The stable water-in-oil emulsion comprises:
1. An aqueous phase;
2. A hydrophobic liquid; and
3. A water-in-oil emulsifying agent.

The polymer-containing emulsion of this invention is comprised of an aqueous phase ranging between 30 and 95% by weight of the emulsion. The aqueous phase is defined as the sum of the polymer or copolymer and the water present in the composition. The preferred range is between 70 and 90% by weight of the emulsion. The most preferred range is between 70 and 80% by weight of the emulsion.

The present invention has a polymer concentration between 10 and 50% by weight of the emulsion. A preferred range is between 25 and 40% by weight of the emulsion. The most preferred range is between 25 and 35% by weight of the emulsion.

The polymers most commonly used in application of this invention are acrylamide polymers which include polyacrylamide and its water-soluble copolymeric derivatives such as, for instance, acrylic acid, methacrylic acid, itaconic acid, acrylonitrile, and styrene. The copolymers contain from about 5 to 95% by weight of acrylamide. The molecular weights of such polymers and copolymers exceed 500,000.

A polymer also useful in the practice of this invention is hydrolyzed polyacrylamide which has from 1 to 50% of the original carboxamide groups hydrolyzed to carboxyl groups. The molecular weights of the hydrolyzed polyacrylamides range from 500,000 to 1 million or more.

The molecular weight of the polymers described above may vary over a wide range, e.g., 10,000 to 25 million. The preferred polymer has a molecular weight in excess of 1 million.

The organic or oil phase of the emulsion is comprised of an inert hydrophobic liquid. The hydrophobic liquid comprises between 5 and 70% by weight of the emulsion. The preferred range is between 5 and 30% by weight of the emulsion. The most preferred range is between 20 and 30% by weight of the emulsion.

The oils used in preparing these emulsions may be selected from a large group of organic liquids which include liquid hydrocarbons and substituted liquid hydrocarbons. A preferred group of organic liquids are hydrocarbon compounds, which contain from 4 to 8 carbon atoms. Thus, such organic hydrocarbon liquids as benzene, xylene, toluene, mineral oils, kerosenes, naphtha, and in certain instances, petroleums may be used. A particularly useful oil from the standpoint of its physical and chemical properties is the ranchchain isoparaffinic solvent sold by Humble Oil and Refinery Company under the tradename Isopar M. Typical specifications of this narrow-cut isoparaffinic solvent are set forth below in Table 1.

TABLE 1

| Specification Properties | Minimum | Maximum | Test Method |
|---|---|---|---|
| Gravity API at 60/60° F | 48.0 | 51.0 | ASTM D 287 |
| Color, Saybolt | 30 | — | ASTM D 156 |
| Aniline point, ° F | 185 | — | ASTM D 611 |
| Sulfur, ppm | — | 10 | ASTM D 1266 (Nephelometric mod.) |
| Distillation, ° F | | | |

TABLE 1-continued

| Specification Properties | Minimum | Maximum | Test Method |
|---|---|---|---|
| IBP | 400 | 410 | |
| Dry point | — | 495 | |
| Flash point, ° F (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is usually present in amounts ranging between 0.1 and 21.0% by weight of the emulsion. The preferred range is between 1.0 and 15.0% by weight of the emulsion. The most preferred range is between 1.2 and 10% by weight of the emulsion.

In the choice of a suitable emulsifier, it is important to take into account variations in monomer solubility, salt content, and the reactivity of monomer groups. Also, variations may occur which dictate that emulsifiers should be tried on a case-by-case method.

The polymers contemplated for use in this invention may be synthesized in emulsion form as described in Vanderhoff et al., U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al., U.S. Pat. Nos. 3,624,019 and 3,734,873, both of which are hereby incorporated by reference.

THE METHOD

THE AQUEOUS SOLUTION OF AN ACRYLAMIDE POLYMER

Once the formaldehyde adduct is prepared, it is added to the 5 to 50% aqueous solution of an acrylamide polymer. Typically, the aqueous solution of the adduct is added directly to the aqueous acrylamide polymer solution with mixing. The molar ratio of the formaldehyde adduct to the aqueous acrylamide polymer may vary from 0.1:1 to 10.0:1 and preferably from 0.3:1 to 3.0:1. The most preferred ratio of the formaldehyde addult to the polymer in the aqueous solution of the acrylamide polymer is from 1:2 to 2:1 based on the amide functionality.

The reaction may be performed at ambient temperatures. However, the reactions may be heated to increase the reaction rate. The reaction is an exothermic reaction and is completed at ambient temperature within approximately 20 minutes.

After the formaldehyde adduct has been reacted with an aqueous solution of an acrylamide polymer, the resulting product is reacted with an alkylating agent. The alkylating agent should be present in a mole ratio to the acrylamide polymer of from 0.01:2 to 2:1. The reaction proceeds at a rapid rate; however it may be heated at temperatures up to 100° C to increase the rate of reaction. Typically, during the course of the reaction an inorganic salt of a weak acid such as sodium carbonate is added to neutralize any acid formed by the reaction of the alkylating agent with excess secondary amine which may be present in the formaldehyde adduct. A preferred alkylating agent is methyl chloride, although alkyl halogen compounds such as ethyl chloride and methyl iodide may be useful. Other alkylating agents which may be useful include benzylchloride, allylchloride and other well-known quaternization agents.

The resulting quaternary modified acrylamide polymer in aqueous solution may then be further stabilized through the addition of a halogen-free oxygen containing inorganic acid to a pH of between 0 – 6. The preferred halogen-free oxygen containing inorganic acid is sulfurous acid. This is due to the fact that besides lowering the pH to increase the stability, it will also react with any unreacted formaldehyde which could crosslink through unreacted amide sites. The product obtained in this manner is stable for several months at room temperature, and retains a high cationic charge during that time.

THE WATER-IN-OIL EMULSION OF A FINELY DIVIDED QUATERNARY MODIFIED ACRYLAMIDE POLYMER

As with the acrylamide polymer in aqueous solution above, the formaldehyde adduct once prepared is added to the water-in-oil emulsion of a finely divided acrylamide polymer. Typically, the aqueous formaldehyde adduct is added slowly with agitation to the water-in-oil emulsion. The mole ratio of the formaldehyde adduct to the polymer contained in the emulsion may vary from 0.1:1 to 10.01:1 and preferably between 0.3:1 to 3.0:1. The most preferred ratio of the formaldehyde adduct to the polymer containing emulsion is 1:2 to 2:1 based on amide functionality.

The reaction may be performed at ambient temperatures. However, the reaction may be heated to increase the reaction rate. The reaction is exothermic and is completed at ambient temperatures within approximately 60 minutes. If it is desired to increase the rate, temperatures as high as 200° F may be used.

Due to the volume of water present in the formaldehyde adduct solution, it is often advisable to add an amount of hydrophobic liquid, such as Isopar M, along with additional water-in-oil surfactants to keep the water-in-oil emulsion stable and fluid. The optimum amount of additional hydrophobic liquid to be added must be determined based on the water-in-oil emulsion containing the acrylamide polymer on an individual basis; however, it is often 25 to 75% by weight of the aqueous formaldehyde solution to be added. The additional water-in-oil emulsifier is added for stability purposes and also is determined on the basis of the acrylamide polymer emulsion being used, as well as the pH of operation and salt concentration. The additional emulsifier however is usually added in a 1 to 25% level on the amount of additional hydrophobic liquid added.

After the formaldehyde adduct has been reacted with the water-in-oil emulsion of finely divided acrylamide polymer, an alkylating agent is added to the system. The mole ratio of alkylating agent to the tertiary amine functionality now present on the acrylamide polymer can vary from 2:1 to 0.01:2. The reaction proceeds at a rapid rate, and is usually complete within two hours at ambient temperature. A preferred alkylating agent is methychloride; however other known quaternizing agents such as methyl iodide ethyl chloride and methyl iodide may be used. The resulting product so obtained is a stable water-in-oil emulsion of a finely divided quaternary modified acrylamide polymer.

To further stabilize the quaternary modified acrylamide polymer above, a halogen-free oxygen containing inorganic acid may be added to a pH of between 0 – 6. The preferred halogen-free oxygen containing inorganic acid is sulfurous acid. This is due to the fact that besides lowering the pH to retard the reversal of the Mannich reaction, it will also scavenge or react with formaldehyde which may crosslining present so as to keep the formaldehyde from crosslinking with any unreacted amide groups which may be present.

The further stabilized water-in-oil emulsion of the quaternary modified acrylamide polymer must be heated, or must be stored at room temperature over a great length of time to enable the water-in-oil emulsion of a finely divided quaternary modified acrylamide polymer to fully invert when added to an aqueous solution, and give high cationic charge values. The emulsion may be heated at temperatures of from 30° to 90° C for a time sufficient to enable the quaternary modified acrylamide polymer to fully invert giving high cationic charge value. The length of time will vary according to the water-in-oil emulsifier used in making the original water-in-oil emulsion of the acrylamide polymer, as well as the extent of the quaternization effected. It has been found that the polymer is usually activated after a period of 4 hours at 60°.

In order to illustrate this invention the following examples are given.

EXAMPLE 1

To a 1 l. round bottom flask equipped with stirrer, condenser, and thermometer was charged 120.0g of acrylamide monomer, 400.0g of de-ionized $H_2O$ and 100.0 of isopropanol. The mixture was heated to 80° C at which time 8ml of a 20% solution of potassium persulfate was added. The reaction was exothermic for 10 minutes, and was then held at 80° C with heating for 2 hrs. Following this period, 100 ml of isopropanol was removed by distillation. The resulting product was a clear solution, having a Brookfield viscosity of around 100 cps having a polymer concentration of 22.7%.

EXAMPLE 2

To 100.0g of the polymer prepared in example 1 was added a mixture of 26.0g of 37% formaldehyde and 24.0g of a 60% solution of dimethylamine. The mixture was stirred for 1 hour at which time 16.50g of gaseous methylchloride and 3.4g of $Na_2CO_3$ were added. The mixture was heated to 30° C for 2 hours and cooled. The resulting polymer solution was clear.

EXAMPLE 3

The solution produced in Example 2 was then treated with 16.0g of gaseous $SO_2$. The resulting product was stable.

EXAMPLE 4

EXAMPLE 4

| Acrylamide emulsion recipe: | |
|---|---|
| ISOPAR M | 27.6 grams |
| Sorbitan Monostearate | 1.65 grams |
| Water | 40.20 grams |
| Acrylamide | 36.51 grams |

EXAMPLE 4-continued

| Acrylamide emulsion recipe: | |
|---|---|
| Sodium Hydroxide | 2.29 grams |
| 2,2'azobis (isobutyronitrile) | 0.07 grams |

The sorbitan monostearate was dissolved in the ISOPAR M and the resulting solution was poured into a 2 liter glass reactor fitted with a stirrer, thermometer, and nitrogen purge. The monomer solution was prepared by dissolving the acrylamide in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

EXAMPLE 5
EXAMPLE 5

| Acrylamide-acrylic acid emulsion recipe: | |
|---|---|
| ISOPAR M | 28.10 grams |
| Sorbitan Monostearate | 1.85 grams |
| Water | 40.00 grams |
| Acrylamide | 33.90 grams |
| Acrylic Acid | 2.40 grams |
| Sodium Hydroxide | 2.30 grams |
| 2,2'azobis (isobutyronitrile) | 0.07 grams |

As in Example 1, the sorbitan monostearate was dissolved in the ISOPAR M and the resulting solution was poured into a two liter glass reactor fitted with a stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion:

EXAMPLE 6
EXAMPLE 6

| Acrylamide-methacrylic acid emulsion recipe: | |
|---|---|
| ISOPAR M | 27.6 grams |
| Sorbitan Monostearate | 1.65 grams |
| Water | 40.20 grams |
| Acrylamide | 34.51 grams |
| Methacrylic Acid | 2.31 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a 2 liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

This invention is further illustrated by the following examples:

EXAMPLE 7

To a 500 ml. flask was added 79.0g of an aqueous 38% formaldehyde solution followed by 90.0g of an aqueous 60% solution of dimethylamine. The mixture was agitated, and kept at temperatures below 104° F for 10 minutes.

EXAMPLE 8

To 210.7g of the emulsion in Example 3 was added 64.0g of Isopar M and 7.7g of Sorbitan monooleate with agitation to produce a stable water-in-oil emulsion.

169.0g of the aqueous formaldehyde-dimethylamine adduct prepared in Example 4 was then added to this emulsion with agitation at room temperature. The pH of the system was alkaline due to excess amine present in the formaldehyde adduct solution. The mixture was then heated at 113° F for 1 hour with agitation to produce a water-in-oil emulsion of a finely divided cationically modified acrylamide polymer.

EXAMPLE 9

To the emulsion produced in Example 8 was added with agitation a solution of 21.2g $Na_2CO_3$ in 60.0g deionized water followed by 75.70 g of methyl chloride. The mixture was stirred for 2 hours at which time it was removed from the reactor.

EXAMPLE 10

To the emulsion produced in Example 9 was added 15.0g of gaseous $SO_2$ at room temperature. The product was a stable emulsion, the product of which remained stable for several months.

EXAMPLE 11

The emulsion of Example 10 was heated for 2 hours at 60° C. The solution was cooled. A stable emulsion of quaternary modified acrylamide polymer resulted.

EXAMPLE 12

Colloid titrations were also done to show any differences in cationic charge in the various samples. The colloid titration gives an estimation of the ionic functionality on polymer (known as percent cationic or cationization) by a method used to determine colloidal charge. This percent cationic value is also a good indication of the percentage of the polymer which has undergone the quaternization and wherein 100% would indicate a complete reaction. The method of determination is as follows:

Sufficient quaternized product is diluted to 1 liter with deionized water so that the resulting solution is 0.03% active. A 5 ml aliquot is taken from the resulting solution and put into a 250 ml beaker, so that the sample contains 1.5 mg of active polymer. This sample is diluted to about 100 ml with DI water (deionized water) and 5.00 ml of standard MGC (0.001 N methyl glycol chitosan) is added. The pH of the solution is adjusted to about 8.0, using dilute NaOH. Two drops of toluidine blue indicator are added and the solution is titrated with PVSK (0.001 N polyvinyl sulfate potassium salt), while stirring magnetically, to a violet endpoint that persists at least 15 seconds. A blank is titrated with 100 ml of DI water and 5.00 ml MGC to the same endpoint. Calculation:

$$\frac{\text{(Net PVSK volume) (eq. wt) (0.001) (100)}}{1.5 \text{ mg sample}} = \% \text{ cationic}$$

The net PVSK volume represents the volume of PVSK required to titrate the sample after subtracting the volume required to titrate the blank. The equivalent weight refers to the molecular weight of a reacted -mer unit, as if it were a cationic monomer.

| Example No. | % Cationic (pH8.0) |
|---|---|
| 2 | 87.0 |
| 2 (1 week at 40° C) | 54.0 |
| 3 | 89 |
| 3 (1 week at 40° C) | 87.0 |
| 8 | 0 |
| 9 | 97.3 |
| 9 (1 week at 40° C) | 20.0 |
| 10 | 36.0 |
| 11 | 98.4 |
| 11 (1 week at 40° C) | 97.7 |

EXAMPLE 13

The product of Example 2 was tested in the settling of Kaoline. The product performed as well as a commercially available amine condensation polymer used for the coagulation of impurities in potable water.

EXAMPLE 14

Standard filter leaf tests were run on the latex samples prepared in Example 11. Filter medium N.Y. 413 was used as a representative type, and blended Stickney sludge containing 5.1% solids was used. Stickney sludge is a blend of Imhoff and digested sewage sludges from the Stickney plant of the Chicago Sanitary District. Fifteen inches (mercury) of vacuum was used; the sludge sample size was 800 ml, and 80 ml of diluted polymer solution was added. The filter leaf cycle utilized was 30 sec. conditioning at a mixer speed of 90 rpm, 60 sec. immersion in the sludge, and 120 sec. drying. Filtrate volume and filter cake weight were measured. Portions of the products were tested at dosages of 2–3 lbs/ton active.

| Polymer | Dosage (16/ton active) | Filtrate (ml) |
|---|---|---|
| 11 | 2 | 245 |
| 11 | 3 | 395 |
| 11 | 2 | 275 |
| 11 | 3 | 410 |

I claim:
1. A process for preparing a stable water soluble quaternary modified acrylamide polymer which comprises the steps of:
A. preparing a formaldehyde adduct of a secondary amine containing 2–8 carbon atoms by mixing together an aqueous formaldehyde solution and a secondary amine containing 2–8 carbon atoms in a mole ratio of from 1:2 to 2:1 so as to produce a 0.1 to 55% by weight aqueous solution of the formaldehyde adduct of a secondary amine;
B. reacting said formaldehyde adduct of Step A with a 5–50% aqueous solution of an acrylamide polymer having an intrinsic viscosity of from 0.1 to 0.7 in a mole ratio of from 1:2 to 2:1 with mixing at ambient temperatures to produce a cationically modified acrylamide polymer;
C. reacting the cationically modified acrylamide of Step B with an alkylating agent, containing 1–7 carbon atoms at alkaline pH and at temperatures between 0–100° C in a mole ratio of alkylating agent to tertiary amine groups on said cationically modified acrylamide polymer of from 1:1 to 2:1 to produce a stable water soluble quaternary modified acrylamide polymer; and then,
D. adding to said water soluble quaternary modified acrylamide polymer a halogen free oxygen containing inorganic acid to a pH of 0–6 to produce a stable water soluble quaternary modified acrylamide polymer.

2. The process of claim 1 wherein said halogen free oxygen containing acid is sulfurous acid.

3. A process for preparing a stable water-in-oil emulsion of a finely divided quaternary modified acrylamide polymer which comprises the following steps:
A. preparing a formaldehyde adduct of a secondary amine containing 2–8 carbon atoms by mixing together an aqueous formaldehyde solution and a secondary amine containing 2–8 carbon atoms in a mole ratio of from 2:1 to 1:2 so as to produce a 0.1 to 55% by weight aqueous solution of said formaldehyde adduct of a secondary amine;
B. adding said formaldehyde adduct of Step A to a water-in-oil emulsion of a finely divided acrylamide polymer which contains:
a. 10–50% polymer by weight;
b. 30–95% of an aqueous phase comprising the polymer and water;
c. 5–70% by weight of a hydrophobic liquid;
d. 0.1–21.0% by weight of a water-in-oil emulsifying agent;
said acrylamide polymer further characterized as having a particle size of from 2 millimicrons to 5 microns within the emulsion, in a mole ratio of said formaldehyde adduct to said polymer of from 1:10 to 10:1 at temperatures of from 32°–200° F with mixing over a time sufficient to produce a water-in-oil emulsion of a finely divided cationically modified acrylamide polymer; and then,
C. reacting said water-in-oil emulsion of a finely divided acrylamide polymer of Step B with an alkylating agent containing 1–7 carbon atoms in a mole ratio of alkylating agent to tertiary amine groups on said cationically modified acrylamide polymer of from 2:1 to 1:0.1 at temperatures of from 20°–100° C for a time sufficient to quaternize said cationically modified acrylamide polymer to produce a water-in-oil emulsion of a finely divided quaternary modified acrylamide polymer.

4. The process of claim 3 wherein said secondary amine containing 2–8 carbon atoms is dimethylamine.

5. The process of claim 3 wherein said alkylating agent containing 1–7 carbon atoms is methyl chloride.

6. A process for preparing a stable water-in-oil emulsion of a finely divided quaternary modified acrylamide polymer which comprises the following steps:

A. preparing a formaldehyde adduct of a secondary amine containing 2–8 carbon atoms by mixing together an aqueous formaldehyde solution and a secondary amine containing 2–8 carbon atoms in a mole ratio of from 2:1 to 1:2 so as to produce a 0.1 to 55% by weight aqueous solution of said formaldehyde adduct of a secondary amine;

B. adding said formaldehyde adduct of Step A to a water-in-oil emulsion of a finely divided acrylamide polymer which contains:
   a. 10–50% polymer by weight;
   b. 30–95% of an aqueous phase comprising the polymer and water;
   c. 5–70% by weight of a hydrophobic liquid;
   d. 0.1–21.0% by weight of a water-in-oil emulsifying agent;
   said acrylamide polymer further characterized as having a particle size of from 2 millimicrons to 5 microns within the emulsion, in a mole ratio of said formaldehyde adduct to said polymer of from 1:10 to 10:1 at temperatures of from 32°–200° F with mixing over a time sufficient to produce a water-in-oil emulsion of a finely divided cationically modified acrylamide polymer;

C. reacting said water-in-oil emulsion of a finely divided acrylamide polymer of Step B with an alkylating agent containing 1–7 carbon atoms in a mole ratio of alkylating agent to tertiary amine groups on said cationically modified acrylamide polymer of from 2:1 to 1:0.1 at temperatures of from 20°–100° C for a time sufficient to quaternize said cationically modified acrylamide polymer to produce a water-in-oil emulsion of a finely divided quaternary modified acrylamide polymer; and then, D. adding to said water-in-oil emulsion of a finely divided quaternary modified acrylamide polymer of Step C a halogen free oxygen containing inorganic acid to a pH of between 0–6 to produce a water-in-oil emulsion of a finely divided quaternary modified acrylamide polymer of greater stability.

7. The process of claim 6 wherein said halogen free oxygen containing inorganic acid is sulfurous acid.

8. A process for preparing a stable water-in-oil emulsion of a finely divided quaternary modified acrylamide polymer which comprises the following steps:

A. preparing a formaldehyde adduct of a secondary amine containing 2–8 carbon atoms by mixing together an aqueous formaldehyde solution and a secondary amine containing 2–8 carbon atoms in a mole ratio of from 2:1 to 1:2 so as to produce a 0.1 to 55% by weight aqueous solution of said formaldehyde adduct of a secondary amine;

B. adding said formaldehyde adduct of Step A to a water-in-oil emulsion of a finely divided acrylamide polymer which contains:
   a. 10–50% polymer by weight;
   b. 30–95% of an aqueous phase comprising the polymer and water;
   c. 5–70% by weight of a hydrophobic liquid;
   d. 0.1–21.0% by weight of a water-in-oil emulsifying agent;
   said acrylamide polymer further characterized as having a particle size of from 2 millimicrons to 5 microns within the emulsion, in a mole ratio of said formaldehyde adduct to said polymer of from 1:10 to 10:1 at temperatures of from 32°–200° F with mixing over a time sufficient to produce a water-in-oil emulsion of a finely divided cationically modified acrylamide polymer;

C. reacting said water-in-oil emulsion of a finely divided acrylamide polymer of Step B with an alkylating agent containing 1–7 carbon atoms in a mole ratio of alkylating agent to tertiary amine groups on said cationically modified acrylamide polymer of from 2:1 to 1:0.1 at temperatures of from 20°–100° C for a time sufficient to quaternize said cationically modified acrylamide polymer to produce a water-in-oil emulsion of a finely divided quaternary modified acrylamide polymer;

D. adding to said water-in-oil emulsion of a finely divided quaternary modified acrylamide polymer of step C a halogen free, oxygen containing inorganic acid to a pH of between 0–6 to produce a water-in-oil emulsion of a finely divided quaternary modified acrylamide polymer of greater stability; and then, E. heating said water-in-oil emulsion of a finely divided quaternary modified acrylamide polymer of greater stability from Step D at temperatures of from 30°–90° C for a time sufficient to enable said quaternary modified acrylamide polymer to fully invert giving high cationic charge values when added to a dilute aqueous solution.

9. A stable water-in-oil emulsion of a finely divided quaternary modified acrylamide polymer which comprises:

A. a water-in-oil emulsion of a finely divided acrylamide polymer which contains from 10 to 50% by weight acrylamide polymer, 25 to 85% by weight water, 5 to 40% by weight of a hydrophobic liquid, and from 0.1 to 5% by weight of a water-in-oil emulsifying agent; which has been reacted with, B. a quantity of an aqueous solution which contains from 0.1–55% by weight of an adduct made from formaldehyde, and a secondary amine, containing a 2–8 carbon atoms, said adduct being formed from reacting an aqueous formaldehyde solution with a secondary amine containing 2–8 carbon atoms in molar ratios of from 1:10 to 10:1, so that the molar ratio of said formaldehyde adduct to said acrylamide polymer is from 2:1 to 1:2; and then adding, C. an alkylating agent containing 1–7 carbon atoms at an alkaline pH at temperatures from 0°–100° C in a molar ratio of tertiary amine on said acrylamide polymer to alkylating agent of from 2:1 to 1:2 to produce a stable water-in-oil emulsion of a finely divided quaternary modified acrylamide polymer.

10. A stable water-in-oil emulsion of a finely divided cationically modified acrylamide polymer which comprises:

A. a water-in-oil emulsion of a finely divided acrylamide polymer which contains from 10 to 50% by weight acrylamide polymer, 25 to 85% by weight water, 5 to 40% by weight of a hydrophobic liquid, and from 0.1 to 5% by weight of a water-in-oil emulsifying agent; which has been reacted with, B. a quantity of an aqueous solution which contains from 0.1–55% by weight of an adduct made from formaldehyde and a secondary amine containing 2–8 carbon atoms, said adduct being formed from reacting an aqueous formaldehyde solution with a secondary amine containing 2–8 carbon atoms in molar ratios of from 1:10 to 10:1, so that the molar ratio of said formaldehyde adduct to said acrylamide polymer is from 2:1 to 1:2; and then adding, C. an alkylating agent containing 1–7 carbon atoms at an alkaline pH at temperatures of from 0–100° C in a mole ratio of tertiary amine on said acrylamide polymer to alkylating agent of from 2:1 to 1:2 to produce a stable water-in-oil emulsion of a finely divided quaternary modified acrylamide polymer; to which is then added, D. a halogen free, oxygen containing inorganic acid to a pH of 0–6 to produce a water-in-oil emulsion of a finely divided quaternary modified acrylamide polymer of greater stability.

* * * * *